Feb. 7, 1956 S. BIMONTE ET AL 2,734,167
TESTING DEVICE FOR CATHODE RAY TUBES
Filed March 14, 1952

INVENTORS:
SAM BIMONTE
JOSEPH F. VALENTI
BY
Karl F. Ross
AGENT

United States Patent Office 2,734,167
Patented Feb. 7, 1956

2,734,167

TESTING DEVICE FOR CATHODE RAY TUBES

Sam Bimonte and Joseph F. Valenti, New York, N. Y.

Application March 14, 1952, Serial No. 276,716

3 Claims. (Cl. 324—72)

The present invention relates to a testing device for cathode ray tubes, more particularly (but not exclusively) for cathode ray tubes used as picture tubes in conventional television receiving sets.

In tracing defects of, say, television receiving sets it is often difficult to ascertain whether the cause of breakdown is located inside the cathode ray tube or in some more readily accessible part of the circuit, except by extensive preliminary tests which in many instances require removal of the apparatus to a properly equipped shop; thus it is not unusual to find, after expending much time and labor, that the trouble could have been remedied by an on-the-spot exchange of the tube itself or of some part associated therewith. Yet not even by taking along a spare tube will the repairman be able to make in all instances a quick determination of the nature of the defect, since inoperativeness of the spare tube may be indicative of failure in the cathode lead, in the heater connection, in the anode supply and so forth.

Our invention has for its object to provide a tester adapted to be inserted, both physically and electrically, in place of the cathode ray tube of a television receiving set or the like and to indicate, by its readily observable operation, the presence or absence of any defect in various circuits associated with different electrodes of the cathode ray tube.

Figure 1:
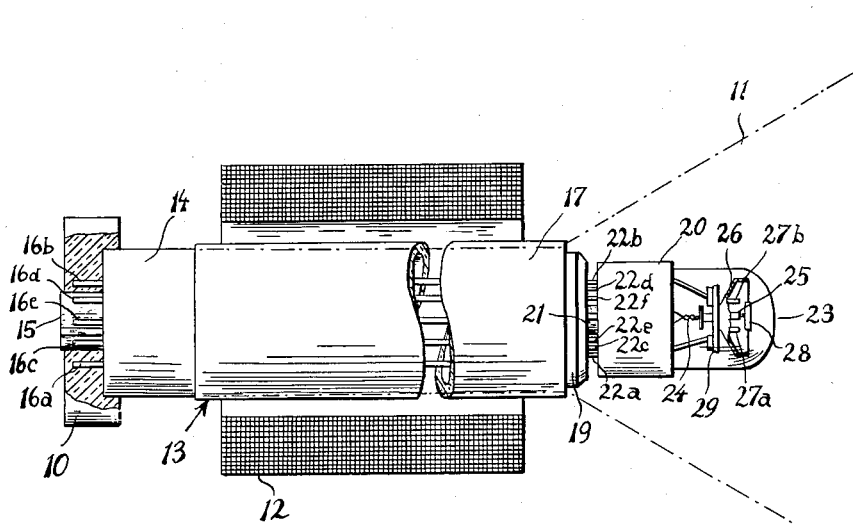
Figure 2:
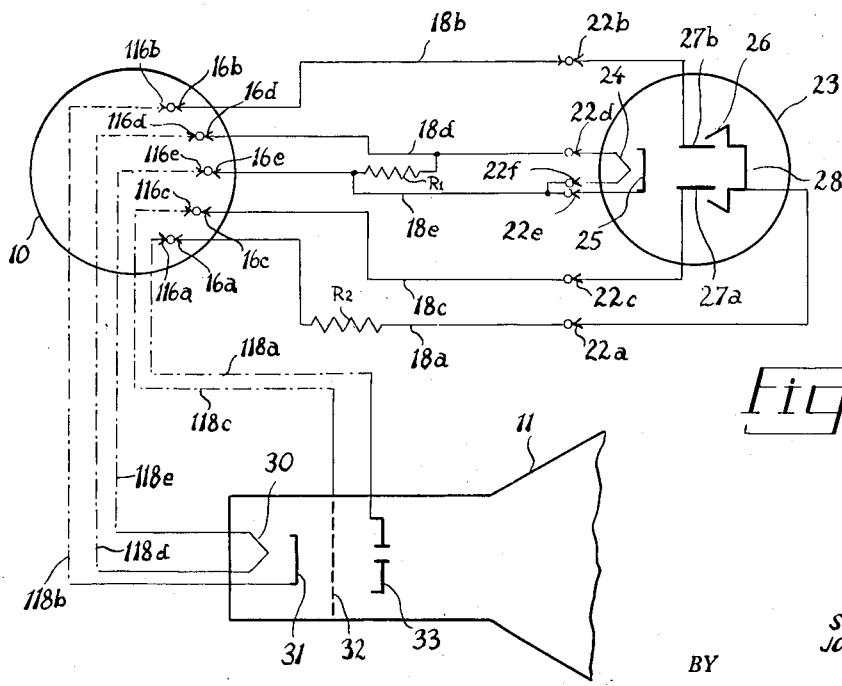

An embodiment of the invention will be described with reference to the accompanying drawing in which:

Fig. 1 is a side elevation of a testing device according to the invention, illustrating the mounting thereof in a socket designed to receive a cathode ray tube; and Fig. 2 is a circuit diagram showing alternative connections between the socket on the one hand and the testing device or the cathode ray tube on the other.

Referring first to Fig. 1, there is shown a socket 10 adapted to receive, in the normal use of a television receiving set (not shown), a cathode ray tube 11 indicated in dot-dash outline, the stem of said tube passing through the usual focusing coil 12. Generally indicated at 13 is the tester according to the invention which is shown held in the socket 10 in a position normally occupied by the tube 11. The device 13 comprises a base portion 14 with a key 15 and five pins 16a, 16b, 16c, 16d and 16e, all fitting into corresponding recesses of the socket 10 as will be readily understood; a tubular body portion 17, within which there extend five leads 18a, 18b, 18c, 18d and 18e (Fig. 2) from corresponding ones of said pins toward an adapter 19 which closes the right-hand end of the body 17; and a head 20, removably seated in the adapter 19 by means of a key 21 and six pins 22a, 22b, 22c, 22d, 22e and 22f. The head 20 terminates in a glass dome 23 containing the elements of a "magic eye" tube of known construction, e. g. of the 6AF6G type, including a heater 24, a cathode 25, a fluorescent screen or target electrode 26, two deflecting electrodes 27a, 27b and an electron shield 29, together with a supporting structure 29 for these elements including the lead-in conductors for the aforementioned electrodes. Part of the screen 26 has been broken away to expose the cathode, the deflecting electrodes and the shield.

From the diagram of Fig. 2 it will be noted that leads 18a . . . 18e connect pins 16a . . . 16e (indicated by arrowheads) to pins 22a . . . 22e, respectively, the adapter terminals (indicated by circles) for pins 22e and 22f being strapped together inside the adapter 19 so as to connect the cathode 25 to one of the legs of heater 24. Fig. 2 also shows certain elements of cathode ray tube 11, including a heater 30, a cathode 31, an intensity control electrode or grid 32 and an accelerating anode 33. Pins adapted to mate with the terminals (circles) of socket 10, and connected, respectively, to the anode 33, the cathode 31, the grid 32 and the two legs of heater 30, are indicated by arrowheads 116a . . . 116e at the ends of dot-dash leads 118a . . . 118e extending toward the electrodes named.

When, in the normal operation of the receiver, the cathode ray tube 11 is held in the socket 10 as indicated in dot-dash lines in Fig. 1, so that the contact pins 116a . . . 116e will engage the terminals indicated by circles, then the usual biasing potentials and operating voltages will be applied to its various electrodes over respective ones of the leads 118a . . . 118e. Thus, heater current will flow through leads 118d and 118e, a highly positive potential will be applied to anode 33 and signal voltages will be impressed upon the grid 32, with the cathode 31 either variably biased, for purposes of brightness control, or held at fixed potential (ground) with the variable bias applied to the grid 32. It will be understood that failure of signal, excessive grid bias, insufficiency of anode potential or an open cathode circuit may be jointly or severally responsible for the absence of an output at the luminous screen of the tube.

If, now, the tube 11 should fail, its replacement by the tester 13 will quickly reveal the nature of the defect, if among those enumerated above, or the fact that the connections are in order and that, therefore, the trouble must lie within the tube itself. Owing to the provision of the elongated body portion 17, which enables the head 20 to project from the other side of the focusing coil 12 when the base 14 is introduced into the socket 10, the operation of the "magic eye" tube elements within the evacuated envelope 23 can be readily observed. Thus a glow will be visible at the heater filament 24 if the circuit connected to leads 18d and 18e is completed; fluorescent screen 26 will light up to indicate the presence of a suitable potential difference between leads 18a and 18e; variation in the luminous area dominated by one of the deflecting electrodes 27a, 27b, e. g. the upper half of the screen 26 controlled by electrode 27b, in response to operation of the brightness control will show the biasing circuit (supposed normally to include the cathode lead 118b) to be intact; and, assuming a video signal to be present, manipulation of the contrast control to vary the amplitude of such signal will likewise be effective, if the corresponding circuit is unbroken, to vary the luminous area dominated by one of the deflecting electrodes 27a, 27b (here the lower half of the screen 26 controlled by electrode 27a). It will be appreciated that where the connections are such that variation of the bias of grid 32 will result from operation of the brightness control (cathode 32 being grounded), no significant changes in the luminosity of the upper half of screen 26 will occur and manipulation of either the brightness control or the contrast control will manifest itself in a change in the luminous area controlled by electrode 27a.

From the foregoing description it will have become apparent that there has been disclosed a comprehensive, simple and inexpensive testing device for the purpose set forth, having dimensions small enough so that one or several of them (to fit different socket sizes, if necessary)

may be conveniently carried by a service man in the field for a quick ascertainment of the nature and the seat of a variety of commonly occurring circuit failures.

Attention is called to the two resistors $R_1$, $R_2$ shown in Fig. 2. Resistor $R_1$ is connected across the heater leads 18d and 18e for the purpose of providing a shunt to reduce the current through the filament 24, as compared with the current normally drawn by the filament 30 of tube 11 when the latter is inserted into the socket 10. Resistor $R_2$ is inserted into the high-voltage lead 18a in order to reduce the operating potential of target electrode 28 with respect to that normally impressed upon the accelerating anode 33. Suitable values for the resistors $R_1$ and $R_2$ are 15 ohms and 50,000 ohms, respectively.

It might be mentioned that with many modern types of television receivers, wherein the socket 10 is movable with respect to the focusing coil 12, it will not be necessary to place the device 13 inside this coil for testing purposes after removal of the tube 11 therefrom, but that in such cases the tube may be left in place and the socket detached therefrom to receive the testing device. It should, furthermore, be understood that the specific embodiment hereinabove described and shown in the drawing has been given merely by way of illustration and that the same is capable of many adaptations and modifications without thereby departing from the spirit and scope of the invention as defined in the appended claims.

We claim:

1. A testing device for the testing of circuits of a cathode ray tube having certain of its electrodes connectable to respective ones of said circuits by way of contact pins receivable by corresponding terminals in a socket, said tube having a stem passing through a focusing coil on being attached to said socket; said device comprising an elongated body of a length at least substantially equal to that of said focusing coil, a base on one side of said body provided with a plurality of connector pins including a first pin, a second pin, a third pin and a fourth pin insertable into said socket, a head on the other side of said body, said head having a transparent envelope, a filament in said envelope visible therethrough, an electron-emissive cathode in said envelope adapted to be heated by said filament, a fluorescent target electrode in said envelope excitable by electrons from said cathode, a deflecting electrode in said envelope intermediate said cathode and said target electrode, a plurality of leads passing through said body and connecting, respectively, said target electrode to said first pin, said deflecting electrode to said second pin, one extremity of said filament to said third pin, and the other extremity of said filament as well as said cathode to said fourth pin, and key means on said base for so aligning said connector pins with said terminals as to connect said filament to a source of heater current, said target electrode to a source of potential more positive than that applied to said cathode by said source of heater current, and said deflecting electrode to a source of variable biasing voltage.

2. A testing device for the testing of circuits of a cathode ray tube having certain of its electrodes connectable to respective ones of said circuits by way of contact pins receivable by corresponding terminals in a socket, said device comprising: a visual indicator tube having a transparent envelope and a plurality of indicator electrodes in said envelope, including a filament, an electron-emissive cathode adapted to be heated by said filament, a fluorescent target electrode excitable by electrons from said cathode, and a deflecting electrode intermediate said cathode and said target electrode; a detachable extension for said indicator tube having a base with connector pins extending therefrom and receivable by said terminals, said extension being provided with leads connected to respective ones of said connector pins and with contact means for electrically extending said leads to respective ones of said indicator electrodes, said leads including a first lead extending to said target electrode, a second lead extending to said deflecting electrode, a third lead extending to one extremity of said filament, and a fourth lead extending to the other extremity of said filament as well as to said cathode; a first resistor of relatively low magnitude within said extension connected across said third and fourth leads, thereby shunting said filament; and a second resistor of relatively high magnitude within said extension inserted in said first lead, thus lying in series with said target electrode.

3. A method of testing, by means of a visual indicator tube of a type having an electron-emitting cathode, a fluorescent target electrode excitable by electrons from said cathode and a deflecting electrode intermediate said cathode and said target electrode, the operativeness of circuits of a cathode ray tube normally held in a socket of a television receiver and containing a plurality of electrodes for emitting and controlling electrons, in accordance with potentials applied to said electrodes by way of supply circuits terminating at said socket, said potentials being variable, at least in part, with the aid of intensity control means in the receiver; said method comprising the steps of removing said cathode ray tube from said socket, inserting said indicator tube into said socket in such manner as to apply a relatively negative potential, a relatively positive potential and a potential variable by said intensity control means to said cathode, said target electrode and said deflecting electrode, respectively, operating said intensity control means upon observing a glow on said target electrode, and removing said indicator tube from said socket after noting the presence or absence of variations in said glow in response to operation of said intensity control means.

References Cited in the file of this patent

UNITED STATES PATENTS

| | | |
|---|---|---|
| 1,949,634 | Simpson | Mar. 6, 1934 |
| 1,976,021 | Hollerith, Jr. | Oct. 9, 1934 |
| 2,014,106 | DuMont | Sept. 10, 1935 |
| 2,318,140 | Clark | May 4, 1943 |
| 2,366,320 | Elston | Jan. 2, 1945 |
| 2,457,575 | Liebscher | Dec. 28, 1948 |